(12) United States Patent
Herman

(10) Patent No.: US 7,451,569 B2
(45) Date of Patent: Nov. 18, 2008

(54) USE OF A LOW NITROGEN FERTILIZER TO PROPAGATE SHOOTS FROM A LOG

(75) Inventor: Barrington Herman, Issaquah, WA (US)

(73) Assignee: Weyerhaeuser Company, Federal Way, WA (US)

( * ) Notice: Subject to any disclaimer, the term of this patent is extended or adjusted under 35 U.S.C. 154(b) by 762 days.

(21) Appl. No.: 10/727,446

(22) Filed: Dec. 3, 2003

(65) Prior Publication Data

US 2005/0120623 A1 Jun. 9, 2005

(51) Int. Cl.
*A01C 1/00* (2006.01)
*A01G 7/00* (2006.01)
*A01H 4/00* (2006.01)

(52) U.S. Cl. .............................. 47/58.1 SE; 47/58.1 R; 47/58.1 FV; 800/268; 800/298; 435/430

(58) Field of Classification Search ............ 47/58.1 SE, 47/58.1 FV, 58.1 R; 800/268, 298; 435/430
See application file for complete search history.

(56) References Cited

U.S. PATENT DOCUMENTS

2005/0120622 A1* 6/2005 Herman ................. 47/58.1 SE

OTHER PUBLICATIONS

Bryan JA, "Accelerating Fraser fir seedling growth with benzylmainopurine," HortSci Apr. 1991, p. 389-390.
Cuenca B, "In vitro adventitious bud regeneration from internode segments of beech," Plant Cell Tiss (3) 2000, p. 213-220.
Preece Je, "Micro- and cutting of propagatino of silver maple, I. Results with adult and juvenile propagules," J Am Hortic Soc Jan. 1991, p. 142-148.
Pytlewski C, "The practical possibilities of the use of BA in vegetative propagation of the Cryptanthus genus," Acta Hortic May 1989, p. 353-358.
Wang YT, "Growth substance, light, fertilizer and misting regulate propagation and growth of golden pothos," HortSci Dec. 1990, p. 1602-1604.
Aldén, T., et al., "Some Methods for Vegetative Propagation," *Swedish University of Agricultural Sciences, Department of Forest Genetics*, Uppsala, Sweden, Feb. 16-17, 1977, pp. 137-147.
Bajaj, Y.P.S. (Ed.), *Biotechnology in Agriculture and Forestry I. Trees I*, Springer-Verlag, Heidelberg, Germany, 1986, pp. 49-100, 113-129, 274-310.
Bhatt, B.P., and N.P. Todaria, "Seasonal Rooting Behaviour of Stem Cuttings of Some Agroforestry Species of Garhwal Himalaya," *Indian Journal of Forestry 13*(4):362-364, 1991.
Brioua, A.H., and C.T. Wheeler, "Growth and Nitrogen Fixation in *Alnus glutinosa* (L.) *Gaertn*. Under Carbon Dioxide Enrichment of the Root Atmosphere," *Plant and Soil 162*(2): 183-191, 1994.
Chalupa, V., "Clonal Propagation of Broad-Leaved Forest Trees In Vitro," *Commun. Inst. Forest. Čhecosl.* 12:255-271, 1982.

(Continued)

*Primary Examiner*—Andrea M. Valenti
(74) *Attorney, Agent, or Firm*—Christensen O'Connor Johnson Kindness

(57) ABSTRACT

The present invention provides methods for promoting the growth of shoots from a log, the methods each including the step of applying a fertilizer solution, that includes less than about 0.01% (w/v) nitrogen, to a member of the group consisting of an Alder log, a Beech log and a Birch log, in an amount sufficient to promote the growth of shoots from the log.

16 Claims, 2 Drawing Sheets

OTHER PUBLICATIONS

Garton, S., et al., "In Vitro Propagation of *Alnus glutinos* Gaertn,"*HortScience* 16(6):758-759 Dec. 1981.

Hahn, D., et al., "Micropropagation and Selection of *Alnus glutinos* Ecotype Clones," *Energy from Biomass 4: Proceedings of the Third Contractors' Meeting*, Paestum, Italy, May 25-27, 1988, pp. 69-77.

Heide, O.M., "Daylength and Thermal Tiime Responses of Budburst During Dormancy Release in Some Northern Deciduous Trees," *Physiologia Plantarum* 88(4):531-540, 1993.

Huss-Dannell, K., "Clonal Differences in Rooting of *Alnus incana* Leavy Cuttings," *Plant and Soil* 59:193-199, 1981.

Huss-Danell, K., et al., "Conditions for Rooting of Leafy Cuttings of *Alnus incana*," *Physiologia Plantarum* 49(2):113-116, 1980.

Huss-Danell, K., "Nitrogen Fixation and Biomass Production in Clones of *Alnus incana*," *New Phytologist* 85(4):503-511, 1980.

Kaur, R., et al., "Micropropagation of *Alnus nepalensis*," *Indian Journal of Forestry* 16(2):162-164, 1993.

Kralik, J., and J. Sebanek, "Effect of Auxin Growth Regulators on Adventitious Root Formation from Basal and Apical Parts of Stem Cuttings in Common Alder (*Alnus glutinosa L.*)," *Acta Universitatis Agriculturae* 31(1-2):5-11, 1983.

Krstinic, A., "Genetics of Black Alder (*Alnus glutinosa* (L.) Gaertn.)," *Analiza Sumarstvo.* 19(2):33-72, 1994.

Lepistö, M., "Vegetative Propagation by Cuttings of *Picea abies* in Finland," *Swedish University of Agricultural Sciences, Department of Forest Genetics*, Uppsala, Sweden, Feb. 16-17, 1977, pp. 87-95.

Monaco, P.A., et al., "Rooting of *Alnus rubra* Cuttings," *Tree Planters' Notes* 31(3):22-24, 1980.

Perinet, P., and F.M. Tremblay, "Commercial Micropropagation of Five *Alnus* Species," *New Forests* 1(3):225-230, 1987.

Perinet, P., and M. Lalonde, "In Vitro Propagation and Nodulation of the Actinorhizal Host Plant *Alnus glutinosa (L.) Gaertn*.," *Plant Science Letters* 29(1):9-17, 1983.

Psota, V., "Rhizogenesis of Stem Cuttings In *Alnus glutinosa (L.) Gaertn*. and *Quercus robur* L. Species as Related to Dormancy and Plant Growth Regulators," *Acta Universitatis Agriculturae* 35(3-4):27-44, 1987.

Psota, V., et al., "Effect of Cyclophysis of the Level of Endogenous Gibberellins and Selected Plant Growth Regulators on Rhizogenesis in Common Alder (*Alnus glutinosa (L.) Gaertn.*)," *Acta-Universitatis Agriculturae* 34(1):7-23, 1986.

Radwan, M.A. et al., "Softwood Cuttings for Propagation of Red Alder," *New Forests* 3(1):21-30, 1989.

Read, P.E., and C.D. Fellman, "Accelerating Acclimation of In Vitro Propagated Woody Ornaments," *Acta-Horticulturae*, 1985, pp. 15-20.

Read, P.E., et al., "Use of Recirculating Hydroponic Systems for Macro- and Micropropagation Studies," *Acta Horticulturae 150*:405-414, 1984.

Robison, T.L., and R.B. Hall, "Approaches to European Alder Improvement," *Proceedings of the 2nd North Central Tree Improvement Conference*, Lincoln, Nebraska, Aug. 5-7, 1981, pp. 65-77.

Saul, G.H., and L. Zsuffa, *Vegetative Propagation of Alder (Alnus glutinosa L.) by Rooted Cuttings*, Forest Research Note No. 33, Ministry of Natural Resources, Ontario, Canada 1982.

Shinn, C.W., "Rooting Conifer Cuttings with a Fog System," *Combined Proceedings 1983*, International Plant Propagators' Society, 1984, pp. 110-113.

Tang, DingQin, et al., "In Vitro Regeneration of *Alnus Cremastogyne Burk* from Epicotyl Explants," *Plant Cell Reports* 15(9):658-661, 1996.

Thakur, I.K. and R. Gupta, "Effect of Auxins on Rooting of *Alnus nitida Endl.* Cuttings," *Indian Journal of Forestry* 21(2):174-175, 1998.

Tremblay, F.M., et al., "Callus Regeneration from *Alnus incana* Protoplasts Isolated from Cell Suspensions," *Plant Science, Irish Republic* 41(3):211-216, 1985.

Tremblay, F.M., et al., "Selection and Micropropagation of Nodulating and Non-Nodulating Clones of *Alnus crispa (Ait). Pursh*," *Plant and Soil* 78(1-2:171-179, 1984.

Wakita, Y., "Plant Regeneration from Protoplasts of Broad-Leaved Trees," *Bulletin of the Utsunomiya University Forests* 33:55-108, 1997.

Welander, M., et al., "Regulation of In Vitro Shoot Multiplication in *Syringa, Alnus* and *Malus* by Different Carbon Sources," *Journal of Horticultural Science* 64(3):361-366, 1989.

Wilson, B.C., and N.W. Jewett, "Propagation of Red Alder (*Alnus rubra Bong.*) by Mound Layering," *Tree Planters' Notes* 37(4):21-23, 1986.

* cited by examiner

USE OF A LOW NITROGEN FERTILIZER TO PROPAGATE SHOOTS FROM A LOG

FIELD OF THE INVENTION

The present application relates to the propagation of Alder, Beech and Birch trees, and to the use of a fertilizer, that includes less than about 0.01% (w/v) nitrogen, to propagate shoots growing from an Alder, Beech or Birch log.

BACKGROUND OF THE INVENTION

Alder, Beech and Birch are economically important tree species that are used to produce lumber and other wood products. There is a demand for Alder, Beech and Birch trees that possess desirable characteristics, such as an accelerated growth rate, or desirable wood characteristics. One approach to propagating Alder, Beech and Birch trees that possess desirable characteristics is to clone these trees. Alder, Beech and Birch trees may be cloned by excising portions of the trees that include meristematic tissue (e.g., buds or lenticels), and inducing the meristematic tissue to produce shoots, which may then be rooted and cultivated to produce mature trees.

The present invention provides methods that facilitate the propagation of numerous shoots from a single parent Alder, Beech or Birch tree. The shoots may be cultivated to produce genetically identical Alder, Beech or Birch trees.

SUMMARY OF THE INVENTION

In accordance with the foregoing, the present invention provides methods for promoting the growth of shoots from a log, wherein the methods each include the step of applying a fertilizer solution, that comprises less than about 0.01% (w/v) nitrogen, to a member of the group consisting of an Alder log, a Beech log and a Birch log, in an amount sufficient to promote the growth of shoots from the log.

The methods of the present invention can be used, for example, to clone Alder, Beech or Birch trees that possess desirable characteristics, such as an accelerated growth rate, or improved wood quality.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
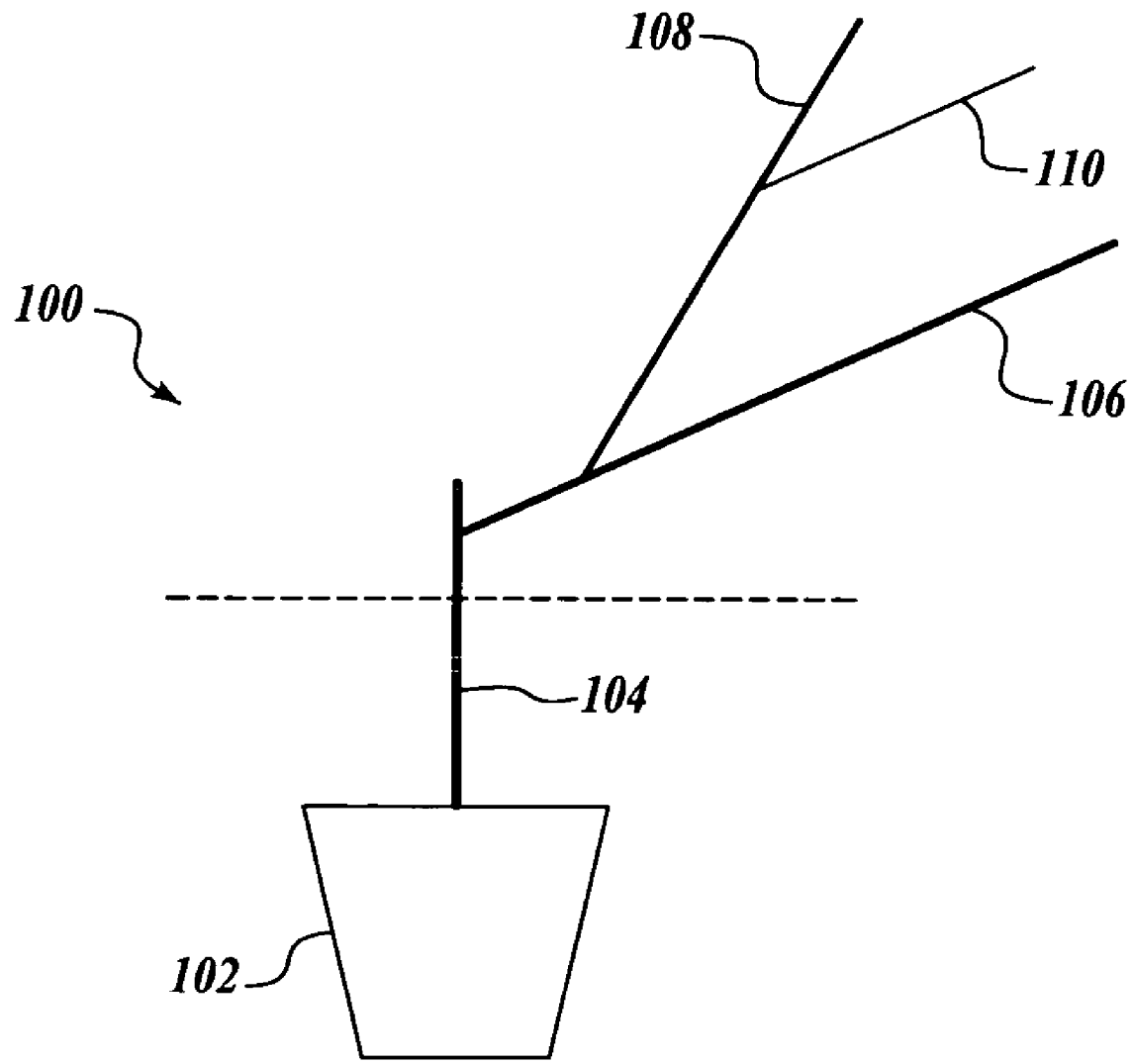
FIG. 1 shows a drawing of an Alder plant grown from a rooted Alder cutting that was removed from an Alder log treated in accordance with the present invention. The Alder plant includes a primary branch, a secondary branch, and a tertiary branch. The dotted line indicates the position on the stem that is cut to excise branches that are cultivated to produce Alder trees.

As used herein, the term "Alder" refers to any member of the genus *Alnus*, such as *Alnus rubra, Alnus glutinosa, Alnus rhombifolia, Alnus viridis*, and hybrids between any *Alnus* species.

As used herein, the term "Beech" refers to any member of the genus *Fagus*, such as *Fagus grandifolia, Fagus sieboldii*, and *Fagus sylvatica*, and any hybrid between any *Fagus* species.

As used herein, the term "Birch" refers to any member of the genus *Betula*, such as *Betula papyrifera, Betula nigra*, and *Betula allegheniensis*, and any hybrid between any *Betula* species.

As used herein, the term "shoot" refers to tissue that grows from any portion of an Alder log, Beech log or Birch log that has meristematic activity. The term "shoot" includes, for example, tissue that grows from a bud or lenticel on an Alder, Beech or Birch log. Shoots may have the appearance of small branches and may form leaves. A shoot can be induced to form roots by excising the shoot from the log, applying a rooting hormone to the cut surface of the shoot, and thereafter cultivating the shoot in a growth medium under environmental conditions that promote root formation.

The present invention provides methods for promoting the growth of shoots from a log, wherein the methods each include the step of applying a fertilizer solution, that comprises less than about 0.01% (w/v) nitrogen, to a member of the group consisting of an Alder log, a Beech log and a Birch log, in an amount sufficient to promote the growth of shoots from the log. Although, for ease of explanation, the invention is described with reference to the treatment of a single Alder, Beech or Birch log, it is understood that typically numerous Alder, Beech or Birch logs are simultaneously treated as described herein.

Alder, Beech or Birch logs that are useful in the practice of the present invention are typically between twelve inches and twenty four inches long, typically have a diameter between one inch and two inches, and typically have a generally cylindrical shape. Alder, Beech or Birch logs are preferably cut from the lower, healthy, branches of an Alder, Beech or Birch tree, although logs cut from upper branches may also be used. The lower branches are physiologically younger than the upper branches, and are more amenable to propagation. Branches and twigs are removed from the logs. The cut logs may be placed on their side on a moist supporting medium (e.g., laid on their side on a moist bed of Vermiculite or Perlite). Logs are preferably cut from Alder, Beech or Birch branches at any time from February 1 through November 30 of a calendar year. Logs cut during December and January can be used in the practice of the present invention, but logs cut during these two months yield relatively few shoots.

The present inventors have observed that fertilizers that include substantial amounts of nitrogen are detrimental to the growth of shoots on Alder, Beech and Birch logs. Consequently, in the practice of the present invention, Alder, Beech or Birch logs are nourished with a fertilizer that includes no more than about 0.01% (w/v) nitrogen. Some fertilizers useful in the practice of the present invention do not include any nitrogen.

Fertilizers useful in the practice of the present invention typically also include potassium and phosphorous, and may optionally contain copper which is both a nutrient and an anti-fungal agent. Fertilizers useful in the practice of the present invention may contain a nutrient supplement, such as a supplement that provides trace elements and/or vitamins. For example, some fertilizers useful in the practice of the present invention include an aliquot of the nutrient supplement STEM (manufactured by W. R. Grace & Co, Fogelsville, Pa. 18052). STEM includes the following components (expressed as percentage by weight): 15% sulfur, 1.45% boron, 4.64% $B_2O_3$, 3.2% copper, 4% CuO, 7.5% iron, 10.7% $Fe_2O_3$, 8.15% manganese, 10.5% MnO, 0.046% molybdenum, 0.069% $MoO_3$, 4.5% zinc, and 5.58% ZnO. Other, representative, nutrient supplements that can be included in fertilizers useful in the practice of the present invention include the following supplements that are sold by Sigma-Aldrich Corporation, 3050 Spruce St., St. Louis, Mo. 63103 (the alphanumeric identifiers in brackets are the catalog identifiers for each product): Chu N6 basal salt mixture (C 1416); DKW/Juglans basal salt mixture (D 6162); Gamborg's B-5 basal salt mixture (G 5768); Gamborg's B-5 basal salt mixture with minimal organics (G 5893); Hoagland's No. 2 basal salt mixture (H 2395); McCown's woody plant basal salt mixture (M 6774); Murashige and Skoog basal salt mixture (M 5524); Quoirin and Lepoivre basal salt mixture (Q 3376); Schenk and Hildebrandt basal salt mixture (S 6765); and White's basal salt mixture (W 0876).

Fertilizers useful in the practice of the present invention may include a vitamin supplement. Representative vitamin supplements that can be included in fertilizers useful in the practice of the present invention include the following supplements that are sold by Sigma-Aldrich Corporation (the alphanumeric identifiers in brackets are the catalog identifiers for each product): 1000×Gamborg's vitamin solution (G 1019), 100×Kao and Michayluk vitamin solution (K 3129), Murashige and Skoog vitamin powder (M 7150), 1000×Murashige and Skoog vitamin solution (M 3900), and Schenk and Hildebrandt vitamin powder (S 3766).

A representative formulation of a fertilizer useful in the practice of the present invention is 0.012 grams per liter STEM, 1.1 gram per liter $K_2HPO_4$, and 1.1 gram per liter $KH_2PO_4$.

Fertilizer can be applied to a log by any means. For example, the log may be completely or partially immersed in a solution of fertilizer, or may be doused with a solution of fertilizer. Typically, however, fertilizer is applied to the log in the form of a mist of liquid droplets. Exemplary droplet diameters are in the range of from about 10 μm to about 20 μm. The mist may be generated by forcing a solution of fertilizer through numerous small apertures in a nozzle. An exemplary range of pressures under which fertilizer solution is forced through a nozzle to form a mist is in the range of from about 60 psi to 75 psi (psi is the abbreviation for pounds per square inch).

Fertilizer is applied for as long as necessary to promote growth of shoots from the log. Typically, fertilization of Alder, Beech or Birch logs begins about two weeks after the cut logs have been placed on their side, on a moist supporting medium, and continues thereafter according to a fertilization schedule, such as the fertilization schedules described herein.

Fertilizer may be applied continuously to the log, but is typically applied intermittently, provided that, if a liquid fertilizer is used to both fertilize and moisten the log, the surface of the log is either kept continuously moist or is not allowed to become dry for more than a few minutes. Thus, for example, liquid fertilizer may be applied at intervals of ten minutes to twenty minutes. For example, liquid fertilizer may be applied for between ten and twenty seconds once every fifteen minutes.

The log is maintained at a temperature that promotes shoot formation, such as a temperature in the range of from about 21° C. to about 26.5° C. The log is also provided with sufficient illumination to promote shoot growth. For example, during each successive 24 hour period the log may be illuminated for 16 consecutive hours, followed by eight consecutive hours of darkness. The log is preferably provided with light energy that includes all of the wavelengths required for photosynthesis.

Although the application of a fertilizer, that includes less than about 0.01% (w/v) nitrogen, and cultivation of the logs at a suitable temperature under moist, and illuminated, conditions is sufficient to stimulate the formation of shoots on the log, the number of shoots can be increased by application of a cytokinin to the log. The term "cytokinin" refers to a class of plant hormones, produced by plant roots, that promote tissue growth and budding and, on application, retard plant senescence. Representative examples of cytokinins include benzylaminopurine (abbreviated as BAP), 6-furylfurylaminopurine (referred to as kinetin), 6-(4-Hydroxy-3-methylbut-2-enylamino) purine and its isomers (collectively referred to as zeatin), and 6-(γ,γ-Dimethylallylamino) purine (referred to as 2iP).

The cytokinin can be in any form (e.g., solid, such as a paste or gel, or liquid), but is typically applied to the log in a liquid form, such as in the form of an aqueous solution. The cytokinin can be applied to a log by any means. For example, the log may be completely or partially immersed in a solution of the cytokinin, or may be doused with a solution of the cytokinin. Typically, however, the cytokinin is applied to the log in the form of a mist of liquid droplets. Exemplary droplet diameters are in the range of from about 10 μm to about 20 μm. The mist may be generated by forcing a solution of the fertilizer through numerous small apertures in a nozzle, such as by the use of a hand pump that pumps a solution of cytokinin through a nozzle defining numerous apertures that are sized to produce a mist of liquid droplets.

The cytokinin may be applied continuously to the log, but is typically applied intermittently. Thus, for example, the cytokinin may be applied once, twice, three times, four times, five times, six times, or seven times per week. The amount of cytokinin applied to the log can readily be determined by one of ordinary skill in the art without undue experimentation. For example, an aqueous solution of BAP, zeatin or kinetin, at a concentration in the range of from about 5 mg/L to about 100 mg/L (e.g., about 20 mg/L), applied to an Alder, Beech or Birch log once per week as a mist, is effective to promote growth of shoots. In the practice of this exemplary embodiment, if a mixture of BAP, zeatin and/or kinetin is used the total cytokinin concentration in the mixture is from about 5 mg/L to about 100 mg/L. Again by way of example, an aqueous solution of 2iP at a concentration in the range of from about 0.5 mg/L to about 10 mg/L (e.g., about 4 mg/L), applied to a log once per week as a mist, is effective to promote growth of shoots. In these exemplary embodiments, the cytokinin solution is applied to the log once per week in an amount sufficient to wet the log.

The cytokinin is applied to an Alder, Beech or Birch log for as long as necessary to promote growth of shoots. For example, an effective amount of cytokinin may be applied once per week, beginning on the fourth week after the log is excised from a tree, for up to about 16 successive weeks.

When shoots have formed on the log they can be removed and propagated to produce trees. In some embodiments of the invention, the fertilizer, that includes less than about 0.01% (w/v) nitrogen, is also applied to the shoots after they have been removed from the log and during the period in which they are forming roots. Thus, some embodiments of the invention include the steps of: (a) applying a fertilizer, that includes less than about 0.01% (w/v) nitrogen, to an Alder, Beech or Birch log in an amount sufficient to promote the growth of shoots from the log; (b) harvesting at least some of the shoots from the log; (c) planting the harvested shoots in a rooting medium in the presence of a rooting hormone; and (d) applying a fertilizer, that includes less than about 0.01% (w/v)

nitrogen, to the planted shoots in an amount effective to promote growth of the shoots.

For example, shoots may be cut off the log, the cut ends of the shoots dipped in a hormone that promotes rooting (e.g., an auxin, such as indole-3-acetic acid), and then placed in a rooting medium, such as a mixture of Perlite and Vermiculite. The fertilizer, that includes less than about 0.01% (w/v) nitrogen, is applied to the shoots while they are forming roots. When the shoots have developed roots, a fertilizer that contains a higher concentration of nitrogen may then be applied to promote vigorous plant growth.

When the shoots have rooted they may be transplanted to a growth medium (e.g., any potting soil adapted to promote the growth of tree seedlings), and allowed to grow until they are large enough to be transplanted to the field, or until they are large enough to provide more cuttings for cultivation.

The following examples merely illustrate the best mode now contemplated for practicing the invention, but should not be construed to limit the invention.

EXAMPLE 1

This example describes a method of the present invention for propagating Alder trees. The method includes the application of a fertilizer that does not include nitrogen to Alder logs and to Alder cuttings. The method can also be used to propagate Birch and Beech trees.

The lowest living branches are cut from Alder trees and cut into logs having a length of about 18 inches, and a diameter of about 1.5 inches. Large branches and twigs are removed from the logs, but small buds, if present, are not removed. The logs are placed into ice-water and transported to a greenhouse. Each log is laid on its side and half submerged in Perlite which has been saturated with water, using a high humidity mist, for two to three days.

The logs are maintained in the greenhouse at a temperature of from about 21° C. to about 26.5° C., and misted for 20 seconds every 15 minutes. The water used to mist the logs contains little or no chlorine. Chlorine can be removed from water, for example, by running the water through a charcoal filter before applying the water to the logs. The water may also be moved through a series of batch storage tanks, thereby allowing most of the chlorine to diffuse into the atmosphere. For example, low volume misting heads that use about 6 to 10 gallons of water per hour, and run at a minimum pressure of 65 psi, are effective for misting the logs. An exemplary misting system useful in the practice of the present invention uses hollow cone nozzles which generate water particles of about 10 µm to 20 µm diameter (e.g., hollow cone nozzles sold by Delavan, Inc., Fuel Metering Products, P.O. Box 969, Hwy 301 South, Bamberg, S.C. 29003, U.S.A.). The water applied through the misting system is heated to about 21.1° C.

Benzylaminopurine (BAP) is applied to the logs once a week. The BAP is dissolved in ethanol, then diluted in water, and applied to the logs using a backpack sprayer which generates a fine mist. The concentration of the BAP solution that is applied to the logs is 20 milligrams per liter (abbreviated as 20 mg/L). The BAP is applied by switching off the mister system immediately before the system is programmed to spray the logs for 20 seconds; applying the BAP solution to the logs, using a backpack mister, until the exposed surfaces of the logs are wet; then switching on the misting system so that the logs are again misted for 20 seconds at the end of each, successive, fifteen minute interval.

The water used to mist the logs includes a low concentration of a fertilizer that does not contain nitrogen. The misting solution is applied at a rate of one liter per square meter per day (which supplies 1.1 g $K_2H$, 1.1 g $KH_2$, and 0.012 g STEM per square meter per day). The conductivity of the fertilizer solution applied to the logs is periodically measured to monitor the amount of salts in the misting system. The conductivity of the misting solution should be maintained in the range of about 115 µSiemens to about 120 µSiemens.

Shoots grow from meristematic tissue, such as lenticels, on the logs. When the shoots are 3 to 4 centimeters tall, they are cut off the log (hence, the cut shoots are referred to as cuttings), but leaving sufficient shoot material to form new shoots on the logs. The shoots may be harvested for several months (e.g., from three to four months), and a productive log will yield more than 50 cuttings. The cut ends of the cuttings are dipped into a rooting hormone which includes an auxin (e.g., Rhizopon AA#2, available from Rhizopon, 13688 Rider Trail North, Earth City, Mo. 63045) so that the hormone is spread uniformly across the cut end, and then the cut end of each cutting is forcefully inserted, by hand, into a 50:50 mixture of Perlite and Vermiculite. The Perlite and Vermiculite mixture is disposed within a rooting tray that includes 104 cavities that each have a volume of about 60 ml. If the cuttings are placed loosely within the Perlite and Vermiculite mixture, rooting is inefficient. Without wishing to be bound by theory, the inventors speculate that physical wounding of the cut end of the cutting (e.g., abrasion caused by forceful insertion into the Perlite/Vermiculite mixture) promotes root formation.

The cuttings are grown in the rooting tray for four to six weeks if a heated bed is used (typically the temperature of the heated bed is about 5° C. higher than the ambient temperature which is in the range of about 21° C. to about 26.5° C.). If an unheated bed is used, the cuttings are rooted for five to seven weeks. The cuttings are misted with the same fertilizer, that includes less than about 0.01% (w/v) nitrogen, that is used to mist the Alder logs. The misting schedule for the cuttings is the same as for the Alder logs (i.e., misted for 20 seconds every 15 minutes), and is reduced to 30 seconds every 22 minutes during the last two weeks of rooting.

The rooted cuttings are then transferred to 4-inch pots that are filled with a potting mixture, and allowed to grow until they reach a height of about 12 inches. A representative potting mixture that is useful for growing the rooted cuttings includes 61% peat, 23% vermiculite, 16% perlite, 0.65 lbs per cubic yard of ferrous sulphate, and 2 lbs per cubic yard of gypsum. The pH of this fresh potting mixture is 6.2, the air filled porosity (AFP) of the fresh potting mixture is approximately 13%, and the nitrogen drawdown of the fresh potting mixture is close to zero (the foregoing values may change during the working life of the potting mixture).

The growing cuttings are fertilized using an overhead sprinkler system that delivers a mist containing a fertilizer that includes a higher concentration of nitrogen than is present in the fertilizer used to mist the Alder logs. For example, a useful fertilizer provides nitrogen in the form of 80% ammonium and 20% nitrate (e.g., the nitrate can be in the form of urea). It is important to use a fertilizer that includes a low concentration of nitrate since rooted Alder cuttings do not grow well in the presence of a high concentration of nitrate. An example of a useful, commercially available, fertilizer is Peters 20:20:20 special purpose mix for continuous liquid feed programs manufactured by W.R. Grace & Co, Fogelsville, Pa. 18052.

When the plants reach a height of about 12 inches, they are transferred to a 1-gallon pot and allowed to grow to a height of about three feet so that the stem is about ¾ inch to 1 inch thick, and is sufficiently strong to support branches which can be harvested to provide cuttings. The plants are fertilized using a drip irrigation system in the gallon pots, which delivers the same fertilizer that is used to fertilize the plants in the 4-inch pots.

The density of the plants growing in the gallon pots should not be more than three plants per square foot, otherwise the plants compete for light and do not form numerous branches which can be harvested as cuttings. If the plant density is less than two plants per square foot, then the plants form numerous quaternary branches which will not efficiently root when excised from the parent plant. Thus, the optimal density is two or three plants per square foot.

When the plants reach a height of about three feet, the stem is cut about 18 inches from the soil. Excised primary, secondary, and tertiary branches can be propagated to become Alder trees. In this regard, FIG. 1 shows a drawing of an Alder plant 100 in a pot 102. Plant 100 includes a main stem 104, a primary branch 106, a secondary branch 108, and a tertiary branch 110. The dotted line in FIG. 1 shows the position on stem 104 that is cut to excise branches that are cultivated to produce Alder trees.

The cut stem is allowed to form more branches and, after a period of about two to three weeks, branches that are about 3 to 4 millimeters in thickness are cut from the stem every ten days or so. The branches that are periodically cut from the main stem, and the branches on the material that is cut from the top of the three-foot plants, are treated as follows to produce Alder trees. The cut branches are referred to as cuttings.

Any leaves on the cuttings are trimmed to form a diamond-shaped wedge, thereby permitting some photosynthesis, but reducing the leaf surface area through which moisture can be lost. The leaf blade should not be trimmed to within 15 mm of the petiole. The cuttings can be stored for up to 30 minutes in a bucket containing an antioxidant solution (e.g., boric acid or ascorbic acid at a concentration of 1 gram/L), and optionally a systemic fungicide, while the leaves are trimmed. The temperature of the antioxidant solution is typically in the range of from 3° C. to 8° C.

Figure 2:
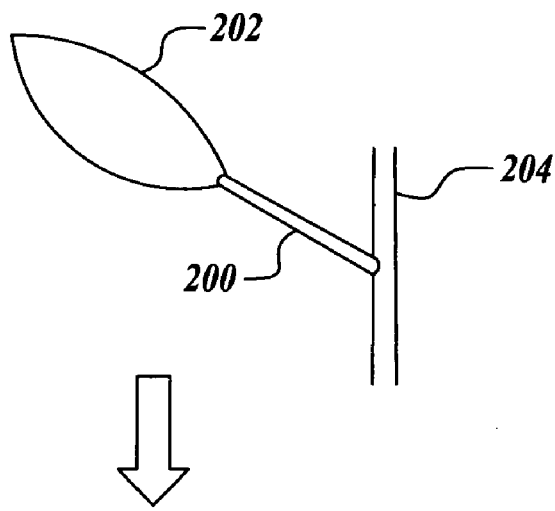
FIG. 2 shows a method of trimming leaves on Alder cuttings.
Figure 2:
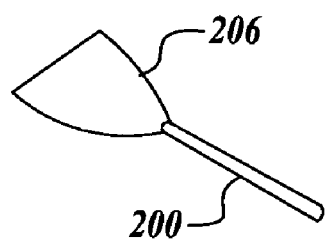
Figure 2:
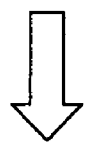
Figure 2:
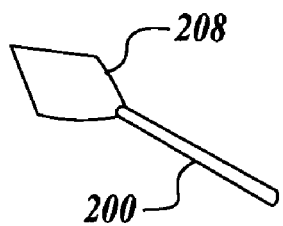

FIG. 2 shows a drawing that illustrates the trimming process. A stem 200 bearing a leaf 202 is cut from a main stem 204, and leaf 202 is cut transversely to produce trimmed leaf 206, which is laterally trimmed to produce generally diamond-shaped leaf wedge 208.

After the cuttings have been trimmed, the cut end of the stem of each cutting is dipped into rooting hormone which should be dispersed evenly across the cut end, and the cut end is placed into a 50:50 mixture of Perlite and Vermiculite in a rooting tray. The cuttings are misted using the same fertilizer solution (that includes less than about 0.01% (w/v) nitrogen) that is applied to the Alder logs, using the same misting schedule that is used for the Alder logs. When the cuttings have formed roots they are transplanted into Styrofoam trays having 44 to 48 cavities per tray. The plants are grown in a cold frame for about five months and misted with the same fertilizer solution used to fertilize the rooted cuttings taken from the Alder logs. During the first week in the cold frame the plants are misted for 30 seconds every 30 minutes, then 30 seconds per hour for the next week, then a heavy droplet spraying system is used that initially sprays for 1 minute every 2 hours. When the plants are approximately 6 inches tall, they are sprayed with a commercial irrigation system as needed.

When the plants are approximately 3 feet tall, they are fertilized with hardening fertilizer (4:25:30, wherein the three successive numbers represent nitrogen (N), available phosphate (as $P_2O_5$) and soluble potash (as $K_2O$)) for from about four weeks to about six weeks. The plants are induced to enter dormancy by cultivating them using hardening fertilizer, decreasing the temperature by opening the cold frame to the elements, and by decreasing the level of illumination to a level that is normal for the beginning of November. The dormant plants are then stored in a freezer (at about −5° C.) until planting season. They are thawed for approximately four days before planting.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for promoting the growth of shoots from a log, the method comprising the step of applying a fertilizer solution, that comprises less than about 0.01% (w/v) nitrogen, to a member of the group consisting of an Alder log, a Beech log and a Birch log, in an amount sufficient to promote the growth of shoots from the log.

2. The method of claim 1 wherein the fertilizer solution does not contain any nitrogen.

3. The method of claim 1 wherein the fertilizer solution is applied as a mist.

4. The method of claim 1 wherein the fertilizer solution is continuously applied to the log.

5. The method of claim 1 wherein the fertilizer solution is intermittently applied to the log.

6. The method of claim 3, wherein the fertilizer solution is applied at a minimum pressure of 65 psi.

7. The method of claim 1, wherein the fertilizer solution comprises potassium and phosphorus.

8. The method of claim 7, wherein the fertilizer solution comprises copper.

9. The method of claim 1, wherein the fertilizer solution comprises a vitamin.

10. The method of claim 1 further comprising the steps of harvesting at least some of the shoots from the log, planting the harvested shoots in a rooting medium in the presence of a rooting hormone, and applying a fertilizer solution, that comprises less than about 0.01% (w/v) nitrogen, to the planted shoots in an amount effective to promote growth of the shoots.

11. The method of claim 10 wherein the rooting medium comprises perlite.

12. The method of claim 11 wherein the rooting medium further comprises vermiculite.

13. The method of claim 1, wherein the log is an Alder log.

14. The method of claim 13, wherein the Alder log is obtained from an Alder tree that is between about 5 years old and about 9 years old.

15. The method of claim 1, wherein the log is a Beech log.

16. The method of claim 1, wherein the log is a Birch log.

* * * * *